US009154376B2

(12) United States Patent
Aziz et al.

(10) Patent No.: US 9,154,376 B2
(45) Date of Patent: Oct. 6, 2015

(54) MULTI-NODE VIRTUAL SWITCHING SYSTEM

(71) Applicant: Cisco Technology, Inc., San Jose, CA (US)

(72) Inventors: Mohammed Aziz, Bangalore (IN); Sudhakar Shenoy, Bangalore (IN); Ganesh Sankarapandiyan, Bangalore (IN); Bhaskar Srinivasan, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 76 days.

(21) Appl. No.: 13/747,520

(22) Filed: Jan. 23, 2013

(65) Prior Publication Data

US 2014/0204805 A1 Jul. 24, 2014

(51) Int. Cl.
*H04L 12/24* (2006.01)
*H04L 12/931* (2013.01)

(52) U.S. Cl.
CPC .......... *H04L 41/0803* (2013.01); *H04L 41/044* (2013.01); *H04L 49/70* (2013.01)

(58) Field of Classification Search
CPC ... H04L 49/70; H04L 41/0803; H04L 41/044; G06F 9/45558
See application file for complete search history.

(56) References Cited

U.S. PATENT DOCUMENTS

| 2004/0103193 A1* | 5/2004 | Pandya et al. ................. 709/224 |
| 2007/0183313 A1* | 8/2007 | Narayanan et al. ........... 370/216 |
| 2013/0142196 A1* | 6/2013 | Cors et al. ..................... 370/360 |
| 2014/0201476 A1* | 7/2014 | Kirscht et al. ................ 711/155 |

FOREIGN PATENT DOCUMENTS

EP 2407879 A1 8/2012

OTHER PUBLICATIONS

International Search Report dated Apr. 8, 2014 cited in Application No. PCT/US2014/011467, 9 pgs.

* cited by examiner

*Primary Examiner* — Jianye Wu
(74) *Attorney, Agent, or Firm* — Merchant & Gould P.C.

(57) ABSTRACT

A multi-node virtual switching system (MVSS) may be provided. A virtual supervisor module (VSM) may be configured onto a network device to serve as a single control point for a network. The VSM may virtualize an interconnection of switches within the network as a virtual fabric and allocate a portion of the network switches to a network domain. The allocated portion of network switches may be represented by the VSM as a single virtualized logical switch. The VSM may then manage the network domain from the single control point.

18 Claims, 4 Drawing Sheets

MULTI-NODE VIRTUAL SWITCHING SYSTEM

BACKGROUND

Virtualizing networking devices and providing single point network management to virtualized networked devices is an emerging challenge facing network providers today. Conventional Virtual Switching Systems (VSS) may virtualize two physical switches into one switch by extending the switching fabric through a point-to-point link, known as a Virtual Switching Link (VSL). The VSL, however, limits conventional VSS to the aggregation of only two switches. Consequently, scaling this conventional model to large networks may limit virtual switching capacity and, in turn, single point network management.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Figure 1:
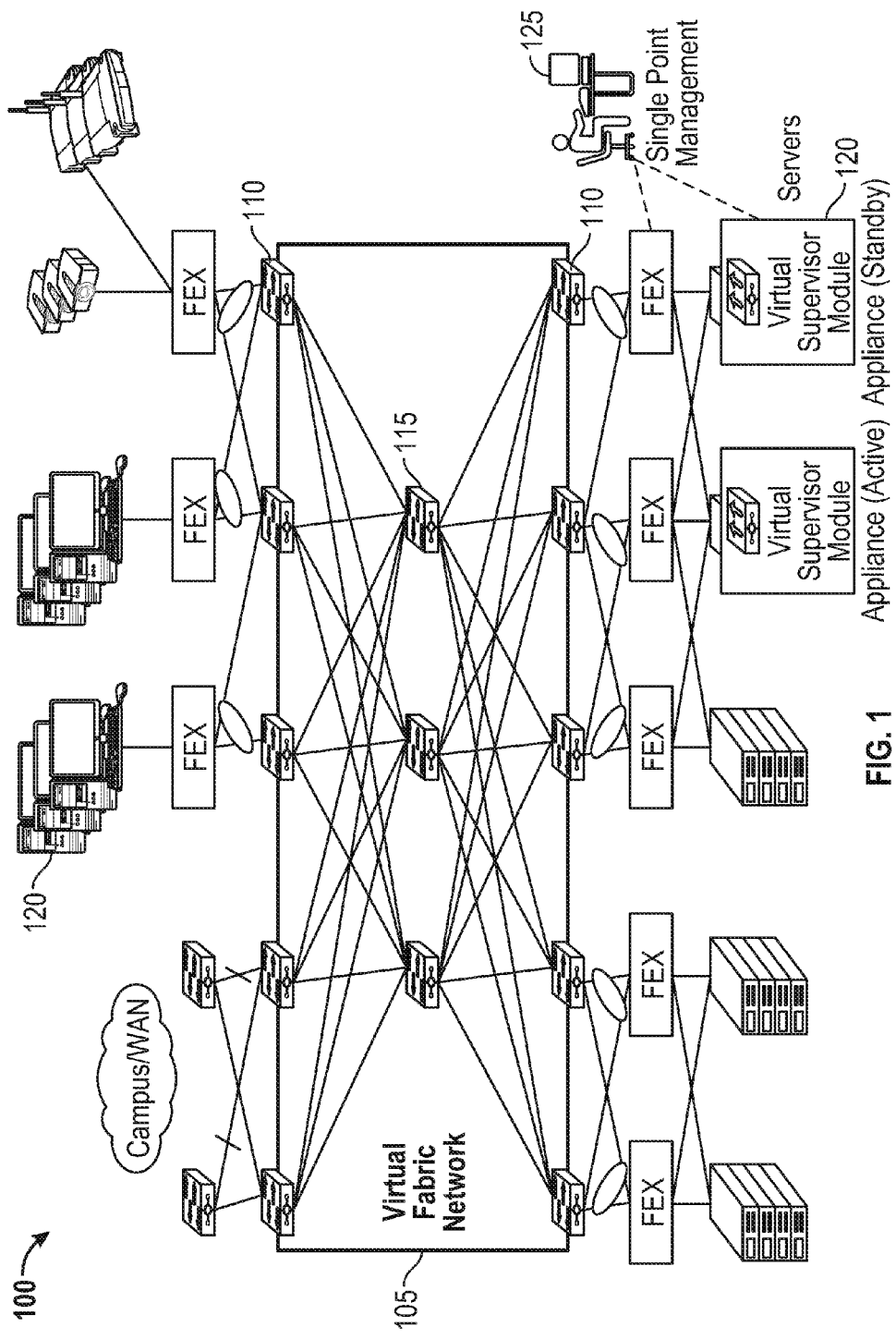
FIG. 1 is a diagram of a network.

A multi-node virtual switching system (MVSS) may be provided. A virtual supervisor module (VSM) may be configured onto a network device to serve as a single control point for a network. The VSM may virtualize an interconnection of switches within the network as a virtual fabric and allocate a portion of the network switches to a network domain. The allocated portion of network switches may be represented by the VSM as a single virtualized logical switch. The VSM may then manage the network domain from the single control point.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure.

A multi-node virtual switching system (MVSS) may be provided. Embodiments of the disclosure may overcome the limitations of the conventional VSS by creating a Virtual Fabric Network (VFN). As will be described in greater detail below, the VFN may enable a plurality of network switches to function as a single virtualized logical switch. The virtualization of the single logical switch may, in turn, facilitate the provision of single point network management.

In conventional VSS technology, single point network management is inhibited by the technology's limited switch aggregation capacity. For instance, since conventional VSS technology may only aggregate switches in pairs, any single point management solution may be limited to controlling the network devices coupled to a particular switch pair. Single point network management in a VFN, however, may have access to all of the network devices in a network because, for example, the VFN may interface with all of the switches in the network.

The VFN may interface with the switches in a network with, for example, a multi-pathing technology. Multi-pathing technology consistent with embodiments of this disclosure may be configured to traverse the switches in a network and map their interconnections. Having mapped the switch interconnections, the VFN may then represent the interconnected switches as a single virtualized logical switch. In turn, the virtualized logical switch may facilitate the provision of a single point network management solution that may have access to any network device connected to any network switch.

FIG. 1 is a diagram of a network 100. VFN 105 may be comprised of leaf node switches 110 and spine node switches 115 interconnected in a CLOS arrangement. Spine node switches 115 may be used to interconnect leaf node switches 110 while leaf node switches 110 may be used to interface with, for example, a network device 120. As mentioned above, VFN 105 may employ a multi-pathing technology to: i) traverse network 100 (i.e., leaf node switches 110 and spine node switches 115), ii) map an interconnection between all of the switching nodes, and iii) virtualize a single logical switch representing the interconnected switching nodes. As will be described in greater detail below, such virtualization may be provided from, for example, a central control station of network 100 running a Virtual Supervisor Module (VSM) 125.

Having virtualized the network switches as a single logical switch, embodiments of the MVSS may emulate a point-to-point connection between the network devices connected to network 100. For example, network device 120 may interface with VFN 105 via a leaf node switch. This leaf node switch may be represented as a virtual port of the virtualized logical switch created by VFN 105. Accordingly, when network device 120 is connected to the leaf node switch, its connection to VFN 105 may be represented by a connection to a corresponding virtual port of the virtualized logical switch. In this way, VFN 105 may emulate a point-to-point connection for each network device connected to network 100 as each network device may be connected to a port of the same virtualized switch.

Consistent with embodiments of the MVSS, single point network management may be provided by VSM 125. For example, VSM 125 may be configured on any network device connected to any leaf node of network 100. Once configured and connected, VSM 125 may gain access to all the network switches and devices connected to VFN 105. As detailed below with reference to FIG. 2, VSM 125 may then be operative to provide for the control and management of the network switches and devices.

Figure 2:
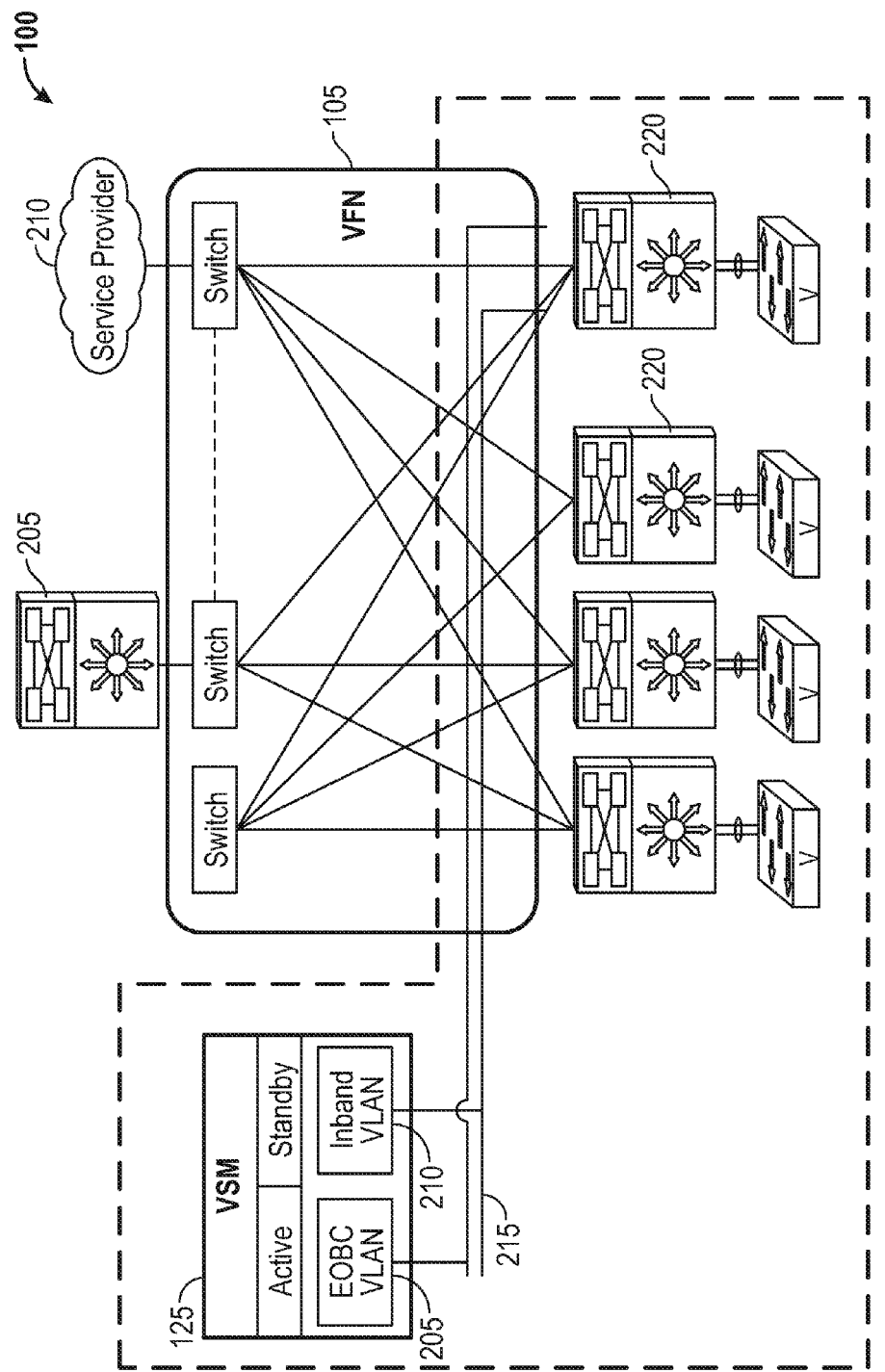
FIG. 2 is another diagram of the network.

FIG. 2 illustrates VFN 105 and VSM 125 in greater detail. VFN 105 may virtualize network 100 by, for example, collapsing the distribution and access layers throughout network 100. Such virtualization may not be limited to campus and data centers 205, but also span across multiple distant campus and data center networks for a service provider 210. These campus and data centers 205 may be represented as nodes 220, with VFN 105 providing the transport layer (behaving as a, for example, backplane fabric of a chassis) with multi-pathing capabilities. The multi-pathing capabilities may further enable VFN 105 to provide, for example, optimal load-balancing, ease of configuration, and connectivity across multiple network topographies.

Consistent with embodiments of the disclosure, VSM 125 may provide a virtualized network management control plane to control nodes 220 through VFN 105. The virtualized network management control plane may provide a look and feel of single point configuration, control, and management across the entire MVSS. For example, each node in the MVSS may be added to VSM 125's control plane as a virtual line card instance. VSM 125 may monitor each of its node elements and, if there are any node failures or link failures, VSM 125 may manage such failures in accordance with, for example, conventional failure handling methods.

In various embodiments, to account for potential VSM 125 failure, a standby instance of VSM 125 may be running at all times on the same or different network device as an active instance of VSM 125. The standby instance may be synced with the active instance by, for example, using a Check-point Framework and Redundancy Framework.

Together, VFN 105 and VSM 125 form the building blocks of the MVSS, with VFN 105 virtualizing the switching nodes of network 100 and VSM 125 providing a virtualized control plane for unifying the management and control of the virtualized nodes. By way of non-limiting example, the MVSS may be visualized as a virtual modular switch chassis, with VSM 125 as a supervisory entity, VFN 105 as a backplane, and nodes 220 as line card entities.

VSM 125 may run as an iOS (dIoU) module on a UCS server. A Virtual Control Communication Path (VCCP) 215 may provide connectivity to VSM 125 by extending an EOBC and In-Band communication channel over VFN 105. VCCP 215 may comprise a 1:n ether-channel having its link protected by CoPP and rate limiting. Consistent with embodiments of the disclosure, VFN 105 may employ an innovative multi-pathing communication protocol to interconnect all the nodes in the MVSS.

Figure 3:
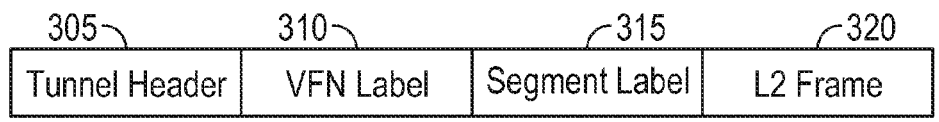
FIG. 3 is an example of a network frame.

FIG. 3 illustrates a frame 300 in a VFN communication protocol. Frame 300 may comprise, but not be limited to, a tunnel header 305, a VFN label 310, an optional segment label 315, and an L2 frame 320. For example, tunnel header 305 may specify a destination and be read to forward packets in VFN 105 to the specified destination. VFN label 310 may provide a switch ID and a VLAN ID to identify a specific virtual switch node and the VLAN associated with the virtual switch node.

Optional segment label 315 may be used in a multi-tenant environment. For example, as will be described in greater detail with reference to FIG. 4, VSM 125 may be configured to segment VFN 105 into a plurality of network domains. With segment label 315, multiple instances of VFN 105 may be carved out of the MVSS. Either VFN label 310 or segment label 315 may be statically assigned or distributed using protocols such as a label distribution protocol (LDP). With LDP, VFN 105 may provide plug-and-play capability in any one of its segmented network domains.

Figure 4:
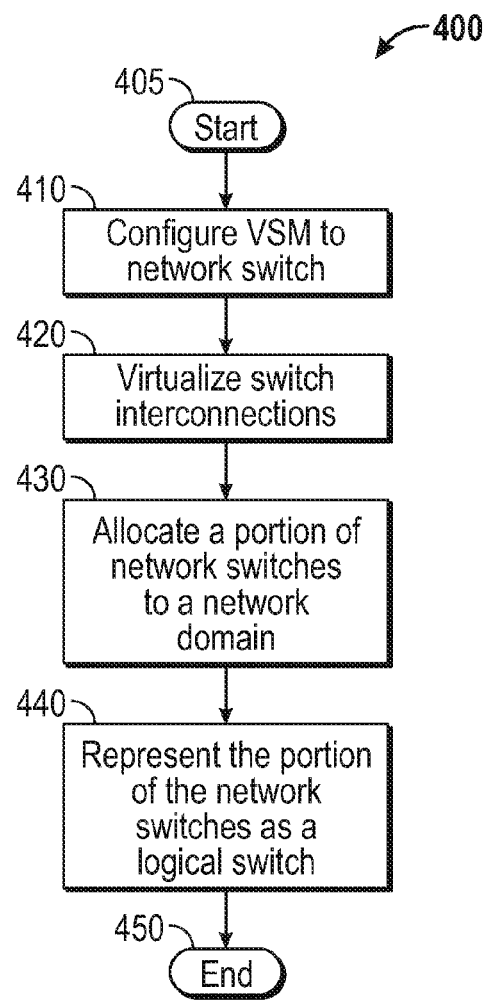
FIG. 4 is a flow chart of a method.

FIG. 4 is a flow chart setting forth the general stages involved in a method 400 consistent with an embodiment of the disclosure. Method 400 may be implemented using, for example, network device 120 and/or VSM 125. Network device 120 is described in more detail below with respect to FIG. 5. Ways to implement the stages of method 400 will be described with reference to VSM 125 for illustrative purposes, though other devices, such as network device 120, may be implemented.

Method 400 may begin at starting block 405 and proceed to stage 410 where VSM 125 may be configured onto a leaf node switch 110 of network 100. In accordance to various embodiments of the MVSS, VSM 125 may be configured onto any leaf node switch of network 100 and provide a single network control point solution from that leaf node switch. The leaf node switch 110 may be coupled to, for example, network device 120. Network device 120 may be a standalone system specifically configured to run VSM 125. Alternatively, network device 120 may be any server capable of operating a network management console.

From stage 410, where VSM 125 is configured, method 400 may advance to stage 420 where VSM 125 may virtualize an interconnection of network switches as a virtual fabric. For example, having been configured at leaf node switch 110, VSM 125 may then be operative to traverse network 100 and map all of the interconnections of the leaf node switches 110 and spine node switches 115. Having mapped the interconnected switches, VSM 125 may model the switch interconnections as a virtual fabric to form VFN 105. This virtual fabric may employ multi-pathing technology to provide a transport layer backplane for network 100, resembling the functionality of actual modular switch chassis fabric. In this way, as a network device connects to leaf node switch 110 of VFN 105, VSM 125 may be configured to automatically discover connected network devices and provide, in addition to other single point network management solutions, the connected devices with a virtualized point-to-point network connection.

Once VSM 125 virtualizes the switch interconnections in stage 420, method 400 may continue to stage 430 where VSM 125 may allocate a portion of the network switches to a network domain. Consistent with single point network management solutions of this disclosure, VSM 125 may provide a network administrator with the functionality of segmenting leaf node switches 110 into a particular network domain. Though no physical changes to the switch interconnections occur, VSM 125 employs the VFN 105 in routing packets of information through network 100 as if separate network domains exist in isolation.

For example, having modeled the switch interconnections in VFN 105, VSM 125 may allocate a first portion of leaf node switches 110 to a first network domain and a second portion of the leaf node switches 110 to a second network domain. Similarly, VSM 125 may provide network administrators with the functionality of dynamically reallocating leaf node switches from the first network domain to the second network domain. In various embodiments of the disclosure, spine nodes 115 may remain undedicated to any network domain to equalize a bandwidth of VFN 105 across various network domains. Accordingly, the bandwidth (or "fabric capacity") for VFN 105 may be extended upon an addition of spine node switches 115.

After VSM 125 allocates the portion of the network switches to the network domain in stage 430, method 400 may proceed to stage 440 where VSM 125 may represent the portion of network switches as a single logical switch for the network domain. For example, VSM 125 may model the allocated leaf node switches as ports of the virtualized logical switch. A network device connected to a leaf node switch may be, in turn, configured to a virtual port of the virtualized logical switch. As such, network domain's capacity for network devices may be known as "port density" and be proportionally related to an amount of leaf node switches 110 allocated to the network domain.

Consistent with embodiments of the disclosure, each network domain and its corresponding allocated leaf node switches 110 may be virtualized as a separate logical switch and have a sub-VSM configured within that domain. Though VFN 105 may be controlled by a master VSM, each sub-VSM may be configured to have the same functionality as VSM 125. Once VSM 125 represents the single logical switch in stage 440, method 400 may then end at stage 450.

An embodiment consistent with the disclosure may comprise an apparatus for performing a method. The apparatus may comprise a memory storage and a processing unit coupled to the memory storage. The processing unit may be operative to connect to a network comprised of a plurality of switches; virtualize a fabric corresponding to an interconnection of the plurality of switches; allocate at least a portion of the plurality of network switches to a network domain; and represent, using the virtualized fabric, the portion of the plurality of switches as a single logical switch.

Yet another embodiment consistent with the disclosure may comprise an apparatus for performing yet another method of the present disclosure. The apparatus may comprise a memory storage and a processing unit coupled to the memory storage. The processing unit may be operative to configure a first virtual supervisor module onto to a first switch of a network comprised of a plurality of switches; virtualize an interconnection of the plurality of switches as a virtual fabric; allocate, via the first virtual supervisor module, a first portion of the plurality of switches to a first network domain; and represent, by way of the virtualized interconnection, the first portion of the plurality of switches as a first virtualized logical switch.

Another embodiment consistent with the disclosure may comprise a system. The system may comprise a plurality of interconnected network switches comprising spine node switches and leaf node switches, wherein the spine node switches interconnect the leaf node switches; a plurality of network devices connected to the network via the leaf node switches; and a single control point connected to the network via one of the leaf node switches, single control point being configured to: virtualize the interconnection of the plurality of interconnected network switches as a virtual fabric, and represent, via the virtual fabric, the interconnection of the plurality of interconnected network switches a single logical switch.

Figure 5:
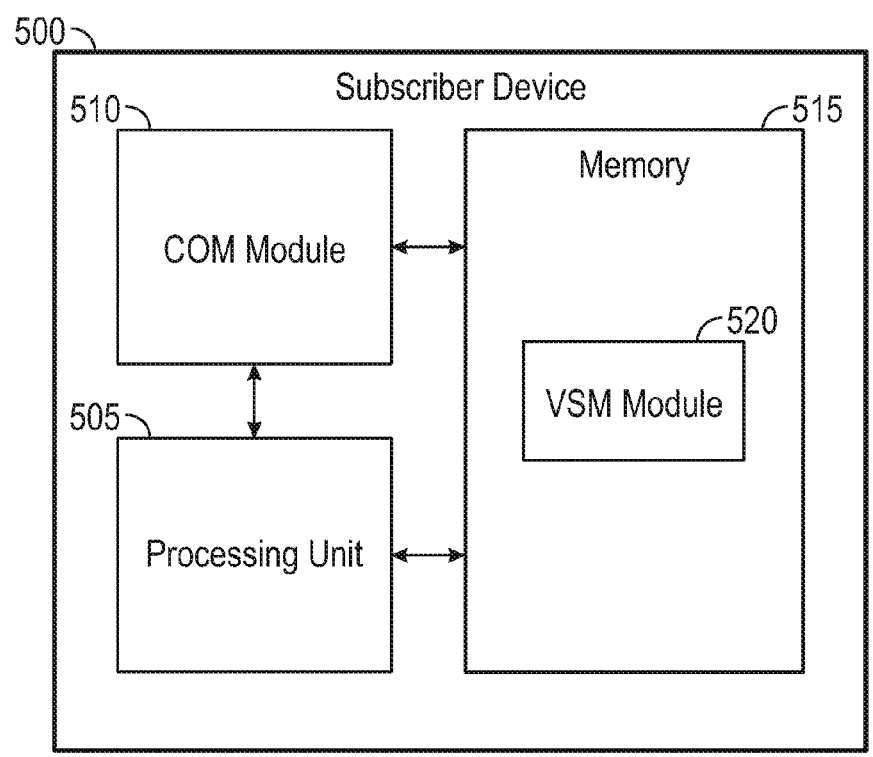
FIG. 5 is one embodiment of a network device.

FIG. 5 is a block diagram of a network device 500. Network device 500 may be a computing device or any other type of networking device, such as network devices 120. Network device 500 may comprise, for example, an operating environment for network devices 120 and VSM 125. Network device 500 may comprise a processing unit 505 operatively tied to a communication module 510, and a memory 515. Communication module 510 may provide communications over, for example, network 100 in a distributed computing environment. By way of example, and not limitation, communication processes interfacing with communication module 510 may include wired processes such as a wired network or direct-wired connection, and wireless processes such as acoustic, radio frequency (RF), infrared, and other wireless media.

Memory 515 may comprise any computer storage media, such as volatile and nonvolatile, removable and non-removable media implemented in any method or technology for storage of information, such as computer readable instructions, data structures, program modules, or other data. Computer storage media may include, but is not limited to, random access memory (RAM), read only memory (ROM), electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by network device 500. Any such computer storage media may be part of network device 500. The term computer readable media as used herein may include both storage media and communication media.

Memory 515 may store, for example, an operating system and one or more programming modules. The operating system, for example, may be suitable for controlling network device 500's operation. Furthermore, memory 515 of network device 500 may comprise a VSM module 125.

Moreover, while executing on processing unit 505, VSM module 125 may perform, for example, one or more stages from method 400 described with respect to FIG. 4. Though network device 500 is shown to have the aforementioned components, other components may be included in network device 500 such as input/output components, display components, and other components.

Embodiments of the disclosure, for example, are described above with reference to block diagrams and/or operational illustrations of methods, systems, and computer program products. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    connecting to a network comprised of a plurality of switches;
    virtualizing a fabric corresponding to an interconnection of the plurality of switches, the plurality of switches comprising a plurality of leaf node switches and a plurality of spine node switches, the plurality of leaf node switches interfacing with a plurality of network devices and the plurality of spine node switches interconnecting the plurality of leaf node switches wherein virtualizing the fabric comprises,
traversing the network, and
mapping all of the interconnections of the plurality of leaf node switches and the plurality of spine node switches;
allocating a portion of the plurality of leaf node switches to a network domain; and
representing, using the virtualized fabric, the portion of the plurality of switches as a single logical switch having a capacity being proportionally related to an amount of leaf node switches allocated to the network domain.

2. The method of claim 1, wherein connecting to the network comprises connecting to the network from a network device connected to a single one of the plurality of switches.

3. The method of claim 2, further comprising establishing the network device as a single control point for configuring and managing the network domain from the one switch.

4. The method of claim 1, wherein virtualizing the fabric corresponding to the interconnection of the plurality of switches comprises virtualizing ports of the single logical switch to correspond to the network devices connected to the leaf node switches.

5. The method of claim 1, wherein representing the portion of the plurality of network switches to the network domain comprises maintaining the spine node switches as undedicated to any particular network domain.

6. The method of claim 1, wherein virtualizing the fabric corresponding to the interconnection of the plurality of switches comprises virtualizing the fabric that is configured to establish a point-to-point connection between each network device connected to the network domain.

7. A method comprising:
configuring a first virtual supervisor module onto to a first switch of a network comprised of a plurality of switches, the plurality of switches comprising a plurality of leaf node switches and a plurality of spine node switches, the plurality of leaf node switches interfacing with a plurality of network devices and the plurality of spine node switches interconnecting the plurality of leaf node switches wherein virtualizing the fabric comprises;
virtualizing an interconnection of the plurality of switches as a virtual fabric;
allocating, via the first virtual supervisor module, a first portion of the plurality of switches to a first network domain; and
representing, by way of the virtualized interconnection, the first portion of the plurality of switches as a first virtualized logical switch having a capacity being proportionally related to an amount of leaf node switches allocated to the first network domain.

8. The method of claim 7, further comprising:
configuring a second virtual supervisor module onto a second switch of the network;
detecting the virtual fabric interconnection;
allocating, via the second virtual supervisor module, a second portion of the plurality of switches to a second network domain; and
representing, by way of the virtualized interconnection, the second portion of the plurality of switches as a second virtualized logical switch.

9. The method of claim 8, further comprising dynamically reallocating at least one switch from the first portion of the plurality of switches tied to the first network domain to the second portion of the plurality of switches tied to the second network domain.

10. The method of claim 8, wherein virtualizing the interconnection of the first portion of the plurality of switches and virtualizing the interconnection of the second portion of the plurality of switches comprises isolating the first network domain from the second network domain.

11. The method of claim 7, configuring the first virtual supervisor module onto the first switch of the network comprises configuring the first virtual supervisor module onto any leaf node switch of the network.

12. The method of claim 7, wherein virtualizing the interconnection of the first portion of the plurality of switches as the virtual fabric comprises interconnecting ports of the plurality of switches so as to form the first virtualized logical switch.

13. A network comprising:
a plurality of interconnected network switches comprising spine node switches and leaf node switches, wherein the spine node switches interconnect the leaf node switches;
a plurality of network devices connected to the network via the leaf node switches; and
a single control point connected to the network via one of the leaf node switches, the single control point being configured to:
virtualize the interconnection of the plurality of interconnected network switches as a virtual fabric wherein the single control point being configured to virtualize the fabric comprises the single control point being configured to,
traverse the network, and
map all of the interconnections of the leaf node switches and the spine node switches, and
represent, via the virtual fabric, the interconnection of the plurality of interconnected network switches a single logical switch having a capacity being proportionally related to an amount of leaf node switches.

14. The network of claim 13, wherein the single control point is further configured to:
establish a first network domain, and
dynamically allocate a first portion of the plurality of switches to the first network domain.

15. The network of claim 14, wherein the single control point is further configured to:
establish a second network domain, and
dynamically allocate a second portion of the plurality of switches to the second network domain.

16. The network of claim 15, wherein the single control point is further configured to:
dynamically reallocate any one of the first portion of switches from the first network domain to the second network domain, and
dynamically reallocate any one of the second portion of switches from the first network domain to the second network domain.

17. The network of claim 13, wherein the leaf node switches are represented as ports of the single logical switch.

18. The network of claim 13, further comprising a back-up control point connected to the network via a different leaf node switch, the back-up control point being configured to remain in 'stand-by' operation until a failure of the single control point is detected.

* * * * *